Jan. 13, 1942.    H. KLAUCKE    2,269,672
TENSIONING DEVICE
Filed Aug. 28, 1940

Hermann Klaucke
INVENTOR.

BY George A. Evans
ATTORNEY.

Patented Jan. 13, 1942

2,269,672

UNITED STATES PATENT OFFICE 2,269,672

TENSIONING DEVICE

Hermann Klaucke, Worcester, Mass., assignor to Chain Belt Company, Milwaukee, Wis., a corporation of Wisconsin Application August 28, 1940, Serial No. 354,572

7 Claims. (Cl. 74—242.11)

In chain and belt transmissions, elongation of the instrumentality transmitting power frequently necessitates compensation either by adjustment of center distance, or by the use of a slack take-up device. More especially in chain transmissions, for which the present invention is particularly adapted, a take-up device is quite essential where the centers are fixed and the drive is subjected to pulsation and shock; similarly, with fixed centers, where one sprocket is arranged vertically, or approaching a vertical position, with respect to the other, chain slack is bound to occur and accordingly, a compensating device should be provided.

Take-ups, when improperly used, may be more of a detriment than an advantage, especially where too great a tension is placed on the chain. In addition to increasing the load, excessive tension may be a cause of improper sprocket action and shorten the chain life.

It is an object of the present invention to provide a take-up device which will automatically compensate for elongation without unduly stressing the power transmitting medium; which will be simple and inexpensive to manufacture; and which will provide sufficient tension on the chain to take up and compensate for the wear and slack at a substantially uniform pressure in all of its operative positions.

The advantages of proper tensioning in such transmissions can best be realized by locating the idler sprocket, actuated by the tensioning means, on the slack side of the chain, reasonably close to the smaller wheel of the transmission so as to secure greater chain contact about this sprocket. However, in so doing, it should be borne in mind, as previously mentioned, that excessive tension is apt to produce unsatisfactory results.

With the above objects in mind, the invention resides in the novel arrangement and combination of parts as more fully described hereinafter and defined in the appended claims.

Reference is made to the drawing for one embodiment of the invention, in which.

Figure 1:
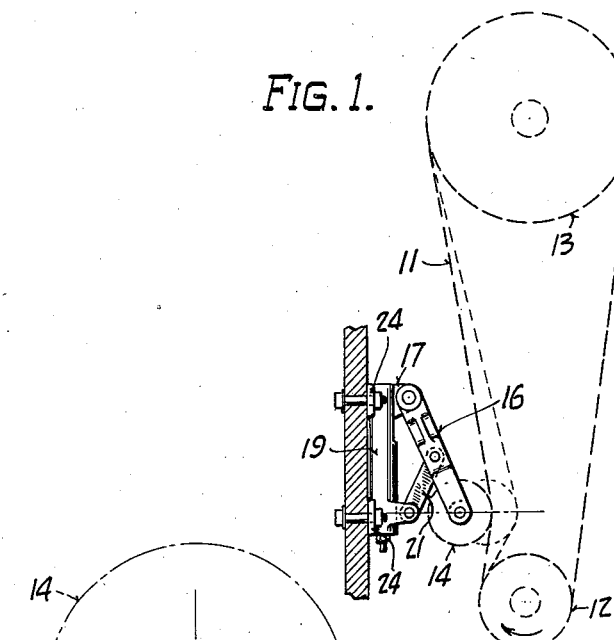
Figure 1 is a diagrammatic view of a chain transmission showing the arrangement of the take-up device with respect thereto.
Figure 3:
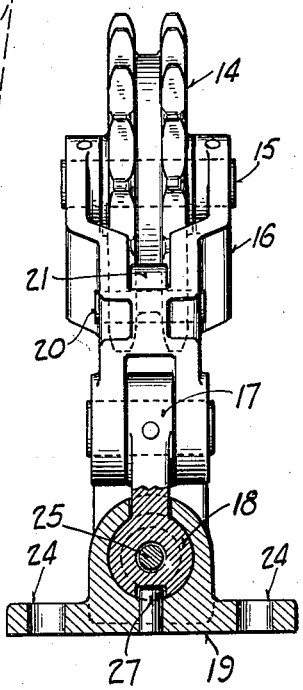
Figure 3 is an end view, partly in section, on the line 3—3 of Figure 2.
Figure 2:
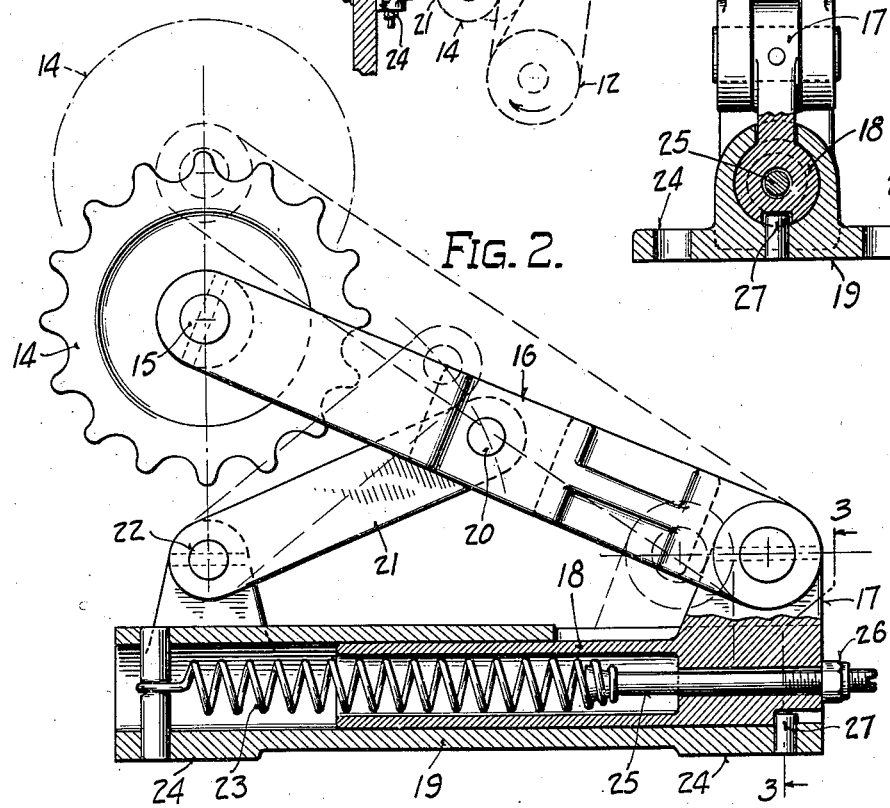
Figure 2 is an enlarged side elevation partly in section of the tensioning device showing the idler sprocket in two extreme positions.

As illustrated in Figure 1, a chain 11 is trained around driving sprocket 12 and driven sprocket 13 to transmit power therebetween, and an idler sprocket or jockey roller 14 is arranged to contact the slack side of the chain just as it leaves the smaller sprocket 12, which in this case happens to be the driver. This arrangement is intended to be more or less diagrammatic in order to show a typical arrangement of elements and the relation in the transmission of the take-up device, which will now be described in detail.

The sprocket or roller 14 as shown on the drawing is provided with two sets of teeth for cooperation with a double strand of chain. Obviously, the roller may have only one set of teeth or it may be arranged with or without teeth to tension any number of chain strands.

Idler sprocket 14 is mounted for rotation on an axle 15 keyed in apertures at the end of a link 16 which is forked to accommodate the sprocket. The end of link 16 opposite that which supports the sprocket is pivotally mounted on an arm 17 which is rigidly secured to a plunger 18 slidably arranged in a base cylinder 19. To accomplish the latter connection, cylinder 19 is slotted and forms a guide for arm 17 which is able to reciprocate with the plunger within the limits of the length of the slot.

Substantially medially of link 16 is a pin 20 on which is pivotally mounted a second link 21, the opposite end of which is pinned as at 22, to one end of the stationary cylinder 19. Pivot 22 is at the opposite end of cylinder 20 from the guide slot just described. Within the cylinder and fastened thereto below the pivot 22 is a tension spring 23, which actuates the plunger and tends to draw it toward the end of the guide slot which acts as a stop to limit such movement.

Cylindrical housing 19 is provided with flanges 24 extending to the sides and apertured for bolts or other means of securing the device to a rigid support. By attaching the spring 23 to a rod 25, slidably extending through the plunger 18, and by threading the end of the rod and engaging the end with stop nut 26, spring tension may be regulated and assured in all operative positions of the take-up. In order to limit outward movement of the plunger as the spring is placed under tension, the plunger may be grooved and a stop 27 aligned therewith so that the end of the plunger coincides with the end of the cylinder when the stop engages the end of the groove.

In my preferred design the link 21 is approximately one-half the length of the link 16 and because link 21 is pivoted at the mid point of the link 16, the movement of the sprocket is always in a straight line at right angles to the straight line connecting the pivoting points of the links. Although not exactly on the axis of the cylinder, these pivoting points may be considered as on that axis in describing the forces which operate in the linkage.

To make available exact dimensions and relativities that may be followed in producing an exemplifying embodiment of my invention, I shall describe in detail one such device. A suitable angle for the longer link 16 to make with the base cylinder 19 when the spring is in retracted position may be approximately 45°. When in extended position, with maximum travel adjustment of the idler sprocket, this angle may be as small as 25°, and yet substantially uniform pressure will be exerted on the chain by the idler roller in its travel from inward to outward positions. This is due to the fact that spring tension, within the elastic limit thereof, is practically a straight line function of spring elongation, that is to say that for each increment of spring elongation there is correspondingly an increase in spring tension, which functional variation is compensated for by the linkage arrangement so that within the limits of take-up adjustment the pressure exerted on the chain is substantially constant.

By providing a link 16, which is 6½ inches long, I am able to secure an adjustment between the two extreme positions of the idler sprocket of approximately 1½ inches, within the angles of 45° and 25° previously described and in this particular arrangement a constant tension of approximately seven pounds may be obtained through the idler when a spring of proper tension is selected. Such tension may be obtained from a spring having $\frac{7}{16}$" pitch diameter made up from $\frac{1}{16}$" wire with a maximum permissive load of 32 pounds and a corresponding extension of .144" per coil, said spring being closely wound to have 25¼ working coils. Should greater adjustment be desired or should a larger constant force be necessary because of the size or weight of the chain used in the transmission, the length of links 16 and 21 may be increased, according to the ratio of 2 to 1 here expressed, and a spring of desired strength selected therefor.

In operation, the device is mounted with respect to the chain so that idler sprocket contact is obtained with the spring in its most extended position. The size of the device selected and the tension which is required will depend upon the particular conditions relating to the transmission, an elaboration of which will not be made herein, as such will be well appreciated by those who are familiar with this art. Thereafter, as chain elongation occurs, slack will be automatically taken up by the spring urging the roller against the chain, and the motion will be in a straight line, transverse to the chain, and with uniform pressure in all positions of the idler. In this way, tension in the chain which is initially obtained under the most desirable conditions is maintained uniformly constant throughout the operative travel of the take-up roller which is generally sufficient for the life of the chain. The means for accomplishing the desired objectives are simple and the device is compact and self-contained.

While one form of my invention has been illustrated and described in precise detail for purposes of clarity of disclosure, it will be understood that variations from the details described may be made within the spirit of the invention and the scope of the appended claims.

The invention having been described what I claim is:

1. In a slack take-up device, the combination of a tensioning member, means for supporting said tensioning member in a plurality of positions, and spring tensioning means applying substantially uniform pressure through said idler in all take-up positions said tensioning member moving in a straight line at right angles to said spring tensioning means.

2. In a slack take-up device, the combination of an idler, means for supporting said idler, a base member, means for supporting said idler supporting means pivotally with respect to said base member and tensioning means applying substantially uniform pressure through said idler in all take-up positions said idler moving in a straight line at right angles to said spring tensioning means.

3. In a slack take-up device, the combination of an idler, a base member, a link supporting said idler, one end of said link being slidably mounted on said base member, a link pivotally mounted on said base member and pinned to said first mentioned link and tensioning means retained in said base member for exerting pressure through said idler.

4. In a slack take-up device, the combination of an idler, a base member, a reciprocating member mounted on said base, a link supporting at one end said idler and at the other end being pivotally mounted on said reciprocating member, a second link approximately half the length of said first link with one end pivoted approximately intermediate the ends of said first link and the other end pivotally attached to said base member, the last point of pivot being in line with the direction of desired idler take-up, and spring tensioning means attached to said reciprocating member compensating for the different moments of force exerted by the idler in different positions to cause substantially uniform pressure on the idler in all take-up positions.

5. A slack take-up device comprising an idler, means for supporting said idler, a base member, a means mounted on said base member restricting the movement of said idler to straight line motion in various take-up positions, and spring tensioning means retained in said base member for applying substantially uniform pressure through said idler in all positions.

6. A self-contained take-up device comprising a take-up member, a base member, means for supporting said take-up member, means pivotally mounted on said base member and linked to said take-up-supporting member for restricting movement of said take-up member in a linear direction, and spring tensioning means connecting said base member and said take-up-supporting member for exerting uniform pressure on said take-up member in all its operative positions.

7. In a take-up device, the combination of a take-up member, a base member, means supporting said take-up member slidably mounted on said base member, spring tensioning means secured to said base member for urging said take-up member away from said base-member, and means controlling the movement of said take-up member with respect to said base member, said last named means compensating for increase in spring pressure in various extended positions to render uniform the pressure exerted by the take-up member.

HERMANN KLAUCKE.